Patented Apr. 15, 1952

2,592,526

UNITED STATES PATENT OFFICE 2,592,526

PROCESS FOR POLYMERIZING ETHYLENE IN AQUEOUS EMULSION

Leslie Seed, Northwich, England, assignor to Imperial Chemical Industries Limited, a corporation of Great Britain No Drawing. Application November 12, 1948, Serial No. 59,787. In Great Britain November 19, 1947

9 Claims. (Cl. 260—29.6)

This invention relates to a new process for the manufacture of emulsions.

It is known that solid ethylene polymers can be converted into aqueous dispersions thereof from pulverulent or friable polythene, water and a dispersing agent. However, such a process is a complicated one because it involves making the polymer, subjecting it to a disintegrating process, and then emulsifying it.

It is also known that aqueous emulsions of solid ethylene polymers can be obtained by polymerising ethylene in presence of an emulsifying agent and a percompound, especially a persulphate. These processes involve polymerisation at high pressures and at temperatures such as 40°–120° C., and although the emulsions so obtained can be used for coating textiles and other materials the coatings so obtained are not flexible enough for most purposes and the polymers are of poor mechanical properties and poor flow characteristics. This is especially so with polymers made in the presence of persulphate catalysts.

Emulsions of solid ethylene polymers can be made with catalysts other than persulphate catalysts, in presence of an emulsifying agent, but polymer quality is poor when the polymerisation is carried out at 120° C. or below, and the emulsion is either not formed or not stable when the polymerisation is carried out at higher temperatures in order to improve the physical characteristics of the polymer.

The object of the present invention is to obtain an aqueous emulsion of solid ethylene polymers directly by polymerisation, the polymers having the high strength and flexibility currently associated with commercially available polythenes. A further object is to obtain a high yield of good quality emulsion of solid ethylene polymers.

We have found that high yields of high quality emulsions of ethylene polymers can be obtained when polymerisation is carried out in presence of both an ionic and a non-ionic emulsifying agent. With this combination we can prepare emulsions at temperatures above the softening points of the polymers.

According to the present invention, we manufacture aqueous emulsions of solid ethylene polymers and interpolymers by a process which comprises polymerising ethylene, alone or together with interpolymerising constituents, at a high temperature and pressure, in presence of water, a non-ionic emulsifying agent, and an organic sulphonic acid or a derivative thereof.

The process is carried out at a high temperature, particularly between 50° and 400° C., but we prefer to work at between 150° and 250° C. in order to get the best polymers. It is also carried out at a high pressure generally exceeding 200 atmospheres, preferably 800–2000 atmospheres or higher. The emulsifying agents are generally used as an aqueous solution containing between 0.5 and 5%, and preferably between 1 and 2%, by weight of the non-ionic agent, and between 0.3 and 3%, and preferably between 0.8 and 2%, by weight of the organic sulphonic acid or derivative thereof. Inorganic salts such as sodium sulphate may be present if desired.

In a typical method of carrying out the process, distilled water, the dispersing agents, the polymerisation catalyst and any other additive such as an inorganic salt or second component in an interpolymer, are added to a suitable stirred pressure vessel which is then closed. Air is removed by evacuation or by purging with ethylene, and the required quantity of compressed ethylene admitted. The sealed vessel is then heated to the required temperature until the polymerisation is at an end, which may be judged by the tendency of the pressure in the vessel to stop falling. Ethylene is continuously or intermittently added to the vessel to maintain the desired reaction pressure during the course of the polymerisation. At the end of the polymerisation the vessel is cooled and opened to atmosphere, the ethylene being bled off and the aqueous emulsion of polymer run from the vessel.

The process may be carried out in presence of an ethylene polymerisation catalyst such as oxygen, a peroxy compound particularly alkyl peroxides, or an azo compound. It can also be carried out in absence of a catalyst, especially at the higher pressures and temperatures such as 200°–300° C. and 1500–2000 atmospheres. Interpolymerising constituents include substances having a carbon-carbon double bond, carbon monoxide, formaldehyde and hydrogen. The process is not affected by the presence of small proportions of inert organic solvents such as benzene. The process may also be carried out continuously by feeding ethylene, an aqueous solution of the dispersing agents, and catalyst to a suitable heated reaction vessel, which may be stirred and of either autoclave or tubular type. The aqueous emulsion of solid polymer and residual unreacted monomer is continuously removed from the reaction zone.

Non-ionic emulsifying agents are water-soluble organic compounds which have at least 4 ether and/or hydroxyl groups in the molecule. The constituent active groups can mostly be represented as $R_1.R_2CHOR_3$, where $R_1$, $R_2$ and $R_3$ are organic radicals which may or may not contain oxygen or are hydrogen. These substances include polyvinyl alcohol; partially or completely hydrolysed polyvinyl acetate and its interpolymers; water-soluble cellulose derivatives such as the alkyl ethers and other carbohydrate derivatives such as the fatty acid esters of mannitan and sorbitan; monoethers of polyethylene glycols such as the mono cetyl ether of a polyethylene glycol containing approximately 40 C atoms, the mono oleyl ether of a polyethylene glycol containing 15–25 C atoms, and the p-isooctyl phenyl ether of a polypropylene glycol containing 20–60 C atoms. Of these we prefer the mono cetyl ether of a polyethylene glycol containing approximately 40 C atoms, as this particularly favours the formation of polymer of melt viscosity which permits the use of the polymer as a textile adhesive.

Organic sulphonic acid derivatives are compounds having the formula $R.SO_3M$, where M is a metallic or similar radical and R is an organic radical including the radical $R'O—$. Examples of such compounds are sodium oleo-p-anisidide sulphonate, calcium stearo-p-anisidide sulphonate, sodium dioctyl sulphosuccinate, p-stearamido benzene sulphonic acid, sodium methyl stearamido ethane $\beta$ sulphonate, sodium cetyl benzene sulphonate, sodium dodecyl benzene sulphonate, sodium cetyl sulphate, ammonium oleyl sulphate, triethanolammonium lauryl sulphate, sodium methyl oleate sulphonate, and potassium stearophenone sulphonate. Of these we prefer the sodium salt of oleo-p-anisidide sulphonate, as stable emulsions of satisfactory particle size range and of high polymer content are most easily obtained with this substance.

The emulsions obtained are highly stable and may be used in conventional coating and other operations. The storage stability of the emulsion, or the ease of spreading in certain specialised applications, may be yet further improved if so desired by the addition of a thickening agent. Such agents in small quantity raise the viscosity of the aqueous medium and help to prevent settling of the emulsion. Ammonium polymethacrylate or any conventional thickener serves this purpose. The dispersions may also be used for making powdered ethylene polymers and interpolymers by precipitation from the emulsion by dilution with low molecular weight aliphatic alcohols, acetone, or other water-miscible polar organic solvent, or with inorganic coagulants such as aluminum sulphate or calcium chloride, filtering, washing and drying. They also serve as adhesives for fabrics and are useful for all purposes for which polyethene dispersions have already been described, with the added advantage that the materials obtained with the present dispersions are tougher and more flexible.

The invention is illustrated but not restricted by the following examples.

*Example 1*

A stirred pressure vessel is charged with 1000 parts of water, 16 parts of the cetyl mono ether of a polyethylene glycol containing 30–40 C atoms, 8 parts of the sodium salt of oleo-p-anisidide sulphonate, 0.19 parts of di-t-butyl peroxide and 1200 parts of ethylene, all parts being by weight. It is then heated to 230° C. and the pressure rises to 1200 atmospheres. Reaction starts, as is shown by a tendency for the pressure to fall, and the pressure is maintained sensibly constant by the continuous addition of more ethylene, a total of a further 130 parts of ethylene being added. After 1 hour there is no further tendency for the ethylene to be consumed, and the vessel is then cooled to room temperature and opened. It contains 1250 parts of a mobile aqueous emulsion of polythene in which the individual particles range in size from 0.5 to 30 microns. This emulsion is stable for many months and is suitable for use in fabric and paper coating operations by conventional means.

Treatment of this stable emulsion with 2500 parts of acetone precipitates the polythene, which is filtered off, washed carefully with 60,000 parts of distilled water and finally with 1500 parts of boiling ethanol. After drying at 60° C. under reduced pressure for 16 hours, 320 parts of pure polythene are obtained as a fine powder. This polythene is completely soluble in hot aromatic solvents and when moulded gives a strong, tough, flexible film. It has a molecular weight of 17,100 and becomes completely fluid at 130° C. with a melt viscosity at 190° C. of 38,000 poises. Under a tension of 120 kg./cm.$^2$ the polythene cold-draws with orientation of the crystallites and finally breaks at a tension of 145 kg./cm.$^2$ and an extension of 500% of the original length.

For comparison, when the above preparation is repeated but in the absence of the sodium salt of oleo-p-anisidide sulphonate a solid, sintered, intractable mass of polymer is obtained. If, instead, the cetyl mono ether of a polyethylene glycol is omitted, the product is not well dispersed as it contains particles over 50 microns in size and a clear aqueous layer rapidly separates. The properties of such a polymer are poor, the melt viscosity and melting point are abnormally high, and pressed films are more brittle and of lower tensile strength with little tendency to cold-draw.

*Example 2*

In a similar manner to that of the preceding example a vessel is charged with 1000 parts by weight of water, 16 parts of the cetyl mono ether of a polyethylene glycol containing 30–40 C atoms, 16 parts of the sodium salt of oleo-p-anisidide sulphonate, and 710 parts of ethylene containing 400 parts per million of oxygen. The vessel is heated to 220° C. for 4½ hours, during which time the pressure falls from 1200 atmospheres to 1150 atmospheres. The product is 1100 parts of smooth emulsion containing 110 parts of a good flexible polythene which becomes molten at a temperature of 108° C. and has a molecular weight of 12,000 as measured by the solution viscosity method.

*Example 3*

In a similar manner a vessel is charged with 1000 parts of water containing 0.2% diethyl peroxide, 20 parts of the mono cetyl ether of a polyethylene glycol containing 8–10 C atoms, 10 parts of sodium cetyl sulphate and 473 parts of ethylene containing 30 parts per million of oxygen. The reaction is conducted at 150° C. for 3½ hrs., the pressure falling from 1300 to 1260 atmospheres. The product is a thin white emulsion of polythene of molecular weight 11,400.

*Example 4*

If the ingredients of Example 3 are altered to 1000 parts of 0.32% diethyl peroxide solution, 16.6 parts of the mono cetyl ether of a polyethylene glycol containing 30–40 C atoms, and 8.3 parts of the sodium oleo-p-anisidide sulphonate, and 770 parts of oxygen-free ethylene. A further 190 parts of ethylene must be added continuously over 1½ hrs. at a reaction temperature of 150° C. in order to maintain the reaction pressure at 1100 atmospheres. The resulting stable aqueous emulsion contains 31% by weight of solid polythene the molecular weight of which is 17,900. The separated solid polymer is completely fluid at 122° C. and a pressed film breaks under a tension of 102 kg./cm.$^2$ at 450% of the original length.

As in Example 1, if the sulphonic acid dispersing agent is omitted no emulsion is obtained. If the non-ionic agent is omitted the emulsion is of poor stability, the polymer is only obtained in poor yield, is of low molecular weight and poor physical properties.

Example 5

A pressure vessel is charged with 1000 parts of water, 15 parts of the mono cetyl ether of a polyethylene glycol containing 30-40 C atoms, 15 parts of sodium oleo-p-anisidide sulphonate, 1.25 parts of azodicyclohexane carbonitrile and 476 parts of ethylene. The reaction is then conducted for 2 hrs. at 130° C. and 1200 atmospheres. Ethylene is added continuously to maintain the pressure sensibly constant. On cooling the vessel an aqueous emulsion containing 24% by weight of solid polyethylene is obtained. The molecular weight of the separated polymer is found to be 18,500 and on fusion it gives a tough, stiff film which only becomes completely molten above 150° C.

Example 6

To 1000 parts of water in a suitable vessel is added 5.4 parts of the isooctyl phenyl ether of a polyethylene glycol containing 20-30 C atoms, 16 parts of sodium oleo-p-anisidide sulphonate, 6.2 parts of a 5% benzene solution of di-t-butyl peroxide, and 456 parts of ethylene. The reaction is conducted at 180° C. and 1300 atmospheres, ethylene being added to maintain the pressure as long as the reaction lasts. The product is a mobile aqueous emulsion containing 10% by weight of solid ethylene polymer of melting point 106° C.

Example 7

The sodium oleo-p-anisidide sulphonate of Example 6 is replaced by 17.5 parts of sodium methyl stearamido ethane β sulphonate, and the isooctyl phenyl ether of the glycol by 16 parts of the mono cetyl ether of a polyethylene glycol containing 20-40 C atoms. The product is a smooth aqueous emulsion containing 8.2% by weight of solid ethylene polymer of molecular weight 10,800 and melting point 108° C.

Example 8

The polyethylene glycol of Example 6 is replaced by 16 parts of polyvinyl alcohol. The resulting product is an extremely stable emulsion containing 16.3% by weight of solid polyethylene of molecular weight 22,400.

Example 9

The polyvinyl alcohol of Example 8 is replaced by 16 parts of a water-soluble mixed methyl and ethyl ether of cellulose. The resulting emulsion contains 23% by weight of solid ethylene polymer and is of outstanding stability.

The process can readily be carried out in a continuous manner. One method of continuous operation involves introducing ethylene and an aqueous medium containing the non-ionic emulsifying agent and the organic sulphonic acid or derivative thereof continuously into a reaction vessel under high pressure. The vessel is kept at a high temperature if necessary by applying heat through the walls, and the emulsion so produced is continuously withdrawn from the vessel together with unconverted ethylene. The unconverted ethylene is separated from the emulsion containing the solid polymers of ethylene and may be reintroduced into the reaction vessel together with fresh ethylene. If desired, a polymerisation catalyst can be introduced also; for example, oxygen catalyst can be mixed with the ethylene or injected into the aqueous medium, or peroxide or other catalysts can be dispersed or dissolved in the aqueous medium. For such a continuous process we may use a stirred reaction vessel or a tubular reaction vessel.

What I claim is:

1. A process for the manufacture of improved aqueous emulsions of solid ethylene polymers which comprises polymerizing a polymerizable composition comprising ethylene at a temperature of from about 50° to about 400° C. and at a pressure exceeding 200 atmospheres, in the presence of water, a water-soluble non-ionic organic emulsifying agent of the class consisting of polyvinyl alcohol, hydrolyzed polyvinyl acetate polymers, the alkyl ether derivatives of cellulose, the fatty acid esters of mannitan, the fatty acid esters of sorbitan, the monoethers of polyethylene glycols, and the monoethers of polypropylene glycols; and a water-soluble ionic emulsifying agent of the class consisting of the salts of organic sulphonates and the salts of organic sulphates.

2. A process for the manufacture of improved aqueous emulsions of solid ethylene polymers which comprises polymerizing a polymerizable composition comprising ethylene at a temperature of from about 150° to about 250° C. and at a pressure between 800 and 2000 atmospheres, in the presence of water, a water-soluble non-ionic organic emulsifying agent of the class consisting of polyvinyl alcohol, hydrolyzed polyvinyl acetate polymers, the alkyl ether derivatives of cellulose, the fatty acid esters of mannitan, the fatty acid esters of sorbitan, the monoethers of polyethylene glycols, and the monoethers of polypropylene glycols; and a water-soluble ionic emulsifying agent of the class consisting of the salts of organic sulphonates and the salts of organic sulphates.

3. A process for the manufacture of improved aqueous emulsions of solid ethylene polymers which comprises polymerizing a polymerizable composition comprising ethylene at a temperature of from about 50° to about 400° C. and at a pressure between 800 and 2000 atmospheres, in the presence of water, a water-soluble non-ionic organic emulsifying agent of the class consisting of polyvinyl alcohol, hydrolyzed polyvinyl acetate polymers, the alkyl ether derivatives of cellulose, the fatty acid esters of mannitan, the fatty acid esters of sorbitan, the monoethers of polyethylene glycols, and the monoethers of polypropylene glycols; and a water-soluble ionic emulsifying agent of the class consisting of the salts of organic sulphonates and the salts of organic sulphates.

4. A process for the manufacture of improved aqueous emulsions of solid ethylene polymers which comprises polymerizing a polymerizable composition comprising ethylene at a temperature of from about 50° to about 400° C. and at a pressure exceeding 200 atmospheres, in the presence of water, a mono-ether of a polyethylene glycol, and a water-soluble ionic emulsifying agent of the class consisting of the salts of organic sulphonates and the salts of organic sulphates.

5. A process for the manufacture of improved aqueous emulsions of solid ethylene polymers which comprises polymerizing a polymerizable composition comprising ethylene at a temperature of from about 50° to about 400° C. and at a pressure exceeding 200 atmospheres, in the presence of water, the mono cetyl ether of a polyethylene glycol containing approximately 40 carbon atoms, and a water-soluble ionic emulsifying agent of the class consisting of the salts of organic sulphonates and the salts of organic sulphates.

6. A process for the manufacture of improved aqueous emulsions of solid ethylene polymers which comprises polymerizing a polymerizable composition comprising ethylene at a temperature of from about 50° to about 400° C. and at a pressure exceeding 200 atmospheres, in the presence of water, a water-soluble non-ionic organic emulsifying agent of the class consisting of polyvinyl alcohol, hydrolyzed polyvinyl acetate polymers, the alkyl ether derivatives of cellulose, the fatty acid esters of mannitan, the fatty acid esters of sorbitan, the monoethers of polyethylene glycols, and the monoethers of polypropylene glycols; and the sodium salt of oleo-p-anisidide sulphonate.

7. A process for the manufacture of improved aqueous emulsions of solid ethylene polymers which comprises polymerizing a polymerizable composition comprising ethylene at a temperature of from about 50° to about 400° C. and at a pressure exceeding 200 atmospheres, in the presence of water, the nono cetyl ether of a polyethylene glycol containing approximately 40 carbon atoms and the sodium salt of oleo-p-anisidide sulphonate.

8. A process for the manufacture of improved aqueous emulsions of solid ethylene polymers in a continuous manner which comprises introducing ethylene, and an aqueous medium containing a water-soluble non-ionic organic emulsifying agent of the class consisting of polyvinyl alcohol, hydrolyzed polyvinyl acetate polymers, the alkyl ether derivatives of cellulose, the fatty acid esters of mannitan, the fatty acid esters of sorbitan, the monoethers of polyethylene glycols, and the monoethers of polypropylene glycols; and a water-soluble ionic emulsifying agent of the class consisting of the salts of organic sulphonates and the salts of organic sulphates continuously into a reaction vessel which is maintained at a temperature of from about 50° to about 400° C. and at a pressure exceeding 200 atmospheres, and continuously withdrawing the emulsion and unconverted ethylene.

9. A process for the manufacture of improved aqueous emulsions of solid ethylene polymers which comprises polymerizing a polymerizable composition comprising ethylene at a temperature of from about 150° to about 250° C. and at a pressure exceeding 200 atmospheres, in the presence of water, a water-soluble non-ionic organic emulsifying agent of the class consisting of polyvinyl alcohol, hydrolyzed polyvinyl acetate polymers, the alkyl ether derivatives of cellulose, the fatty acid esters of mannitan, the fatty acid esters of sorbitan, the monoethers of polyethylene glycols, and the monoethers of polypropylene glycols; and a water-soluble ionic emulsifying agent of the class consisting of the salts of organic sulphonates and the salts of organic sulphates.

LESLIE SEED.

REFERENCES CITED

The following references are of record in the file of this patent:

UNITED STATES PATENTS

| Number | Name | Date |
|---|---|---|
| 2,388,600 | Collins | Nov. 6, 1945 |
| 2,462,390 | Harmon | Feb. 22, 1949 |
| 2,473,929 | Wilson | June 21, 1949 |
| 2,493,965 | Haefele | Jan. 10, 1950 |
| 2,542,783 | Seed | Feb. 20, 1951 |

FOREIGN PATENTS

| Number | Country | Date |
|---|---|---|
| 117,272 | Australia | Sept. 19, 1946 |

OTHER REFERENCES

Kline: Modern Plastics, pages 153–160, 206, 208, 210, 212, 214, 216, 218 and 220, June 1946.